Feb. 12, 1924.
1,483,336
R. M. CORL
METHOD AND APPARATUS FOR FORMING GLASS
Filed July 26, 1918
4 Sheets-Sheet 1

INVENTOR
Robert M. Corl.
By Owen, Owen & Crompton,
His attys

Patented Feb. 12, 1924.

1,483,336

UNITED STATES PATENT OFFICE.

ROBERT M. CORL, OF MAUMEE, OHIO, ASSIGNOR, BY MESNE ASSIGNMENTS, TO ERIE GLASS COMPANY, OF TOLEDO, OHIO, A CORPORATION OF DELAWARE.

METHOD AND APPARATUS FOR FORMING GLASS.

Application filed July 26, 1918. Serial No. 246,877.

*To all whom it may concern:*

Be it known that I, ROBERT M. CORL, a citizen of the United States, and a resident of Maumee, in the county of Lucas and State of Ohio, have invented a certain new and useful Method and Apparatus for Forming Glass; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

This invention relates to the manufacture of glass, and particularly to the continuous drawing of a mass of relatively thick glass from a tank or other source of supply, preferably while still heated, raising the temperature thereof, at a relatively restricted zone, to a flowing consistency, whereby the thickness of the mass is reduced to a finished commercial thickness, which may be varied depending on the temperature conditions and the speed of advance imparted to the reduced column relative to the thicker mass.

The present invention differs from that embodied in my pending application Serial No. 232,841, filed May 6, 1918, as a continuation of my application Serial No. 163,569, filed April 21, 1917, in that the present invention contemplates the continuous drawing of a column of metal from a molten mass in a thickness which is greater than the desired finished sheet, and while the column is still heated, subjecting it at a zone which is relatively restricted lengthwise of the sheet, to a heat sufficient to soften and flow the metal to reduce its thickness to that of the finished ware desired; whereas in said former application the treated column was not drawn up from the pot or source of supply and subsequently heated and shaped. In other words the present invention contemplates an improvement on the "direct" method of drawing sheet glass in finished size as distinguished from the method disclosed in said former application.

It has for years been the endeavor of inventors and workers in this industry to produce a mechanism or method which would draw the finished ware direct from the tank at sufficient speed and of suitable quality to be commercially successful. With my method many of the difficulties and disadvantages encountered in the old "direct" method, in which the finished ware is drawn direct from the tank, are overcome, as I produce a sheet mass which is several times the thickness of the desired ware and which is reduced to the commercial thickness desired. It is not necessary to change the drawing mechanism which produces the sheet mass when it is desired to change the sheet thickness. Furthermore, the large quantity of glass in the sheet mass enables its temperature and shape to be more readily controlled than is possible with the "direct" method, and by using the tank or furnace solely as a glass melting means its maximum production can be obtained without limiting it to the speed of production of the finished ware. In the "direct" method the efficiency of the tank is often greatly reduced when a sheet is formed which extracts a quantity of molten glass which is considerably less than the melting capacity of the furnace. With my method the furnace can be maintained at its maximum efficiency production, the sheet mass being maintained practically constant in size and thickness and drawn at a speed sufficient to take care of the full melting capacity of the furnace. Very great difficulty is experienced in the "direct" method in controlling the temperature of the huge mass of molten glass when producing thin sheets. Glass of a temperature suitable for drawing is very sensitive to temperature changes, it being just above the temperature at which it will solidify, and the continuous drawing of a sheet of glass of common window glass thickness is necessarily an extremely delicate and sensitive operation when produced from a mass of molten glass of many tons.

An object of my invention is to overcome the above difficulties and produce a sheet mass which is comparatively easy to control because of its having sufficient mass to give it strength and to reduce its sensitiveness to sudden changes of temperature.

A further object of the invention is to overcome the very serious troubles incident to bending the finished glass sheet over the so-called bending-roll in the "direct" method. Glass to be bent over a bending-roll must be of a temperature cool enough for the surface finish not to be destroyed by contact with the roll. If the sheet is too hot it will not draw correctly and may sag back into the molten mass, or have its surface finish destroyed, and if the sheet is too cool it may crack or not bend smoothly. All of these conditions demand a very careful adjustment, and when ware of high quality is desired the difficulty of controlling all these factors greatly reduces the commercial value and possibility of the use of such "direct" method for the production of good grades of commercial sheet glass. With my invention the finished ware is not bent over a roll after being shaped, neither is it subjected to strains and surface chilling by too early contact with a metal surface. This is a very great advantage as it is extremely difficult to prevent the rolls from destroying the surface finish. Furthermore, with my invention, the finished ware is produced away from the terrific heat of the melting furnace, and the coverting means are constructed to permit of easy access and handling. This results in great advantage as it enables the operator to easily and quickly control the temperatures and forming mechanism. In the "direct" method most defects cannot be remedied after the sheet is formed, whereas with my invention the converters can be readily adjusted to any desired change in the sheet mass. Most defects, however, disappear naturally when the sheet mass is reduced to the finished ware, and the production has a beautiful natural fire finish on both sides, as the ware, after being subjected to the converting heat, does not come in contact with any surface until sufficiently cooled to prevent injury.

The invention is fully described in the following specification, and while the method disclosed is capable of being practiced by numerous apparatus, only one of such apparatus is illustrated in the accompanying drawings, in which,—

Referring to the drawings, 1 designates a furnace, tank or other suitable source of supply for molten glass 2 from which a column of glass 3 of sheet form is drawn, said tank or source of supply being disposed within a furnace or heating chamber 4 formed by a wall or casing 5, as is well understood in the art. The column 3 at a suitable height above the tank 1 passes over a bending-roll 6 and thence forward over an endless chain-conveyor 7 by which it is supported and which cooperates with a superposed endless chain having pressure feet 8 to impart the desired drawing or forward feeding movement to the sheet. The furnace and drawing means illustrated are the same, or practically so, as those illustrated and described in the Colburn Patent No. 1,122,692 and need not therefore be specifically described, as the specific construction thereof forms no part of the present invention and may be varied materially without avoiding the features of the invention.

The glass column or sheet 3, which, in the carrying out of my invention, is relatively of considerable greater thickness than a finished or commercial sheet, such as is formed in the "direct" methods now commonly employed, passes from the furnace through a front opening 9 therein, the size of which is regulated by an adjusting gate 10, into a converting chamber or compartment 11 in which is located the means for applying heat to the sheet mass or column to reduce its thickness the desired extent after leaving the conveyor 7 or other advancing means. The sheet, after being reduced in the converter compartment to the finished or desired commercial thickness, passes through or over a supporting and temperature controlling means 12 wherein the sheet temperature is corrected, if desired, and from which it thence passes into and through a lever 13, which is equipped with any suitable sheet conveying means, as is well understood in the art.

Figure 3:
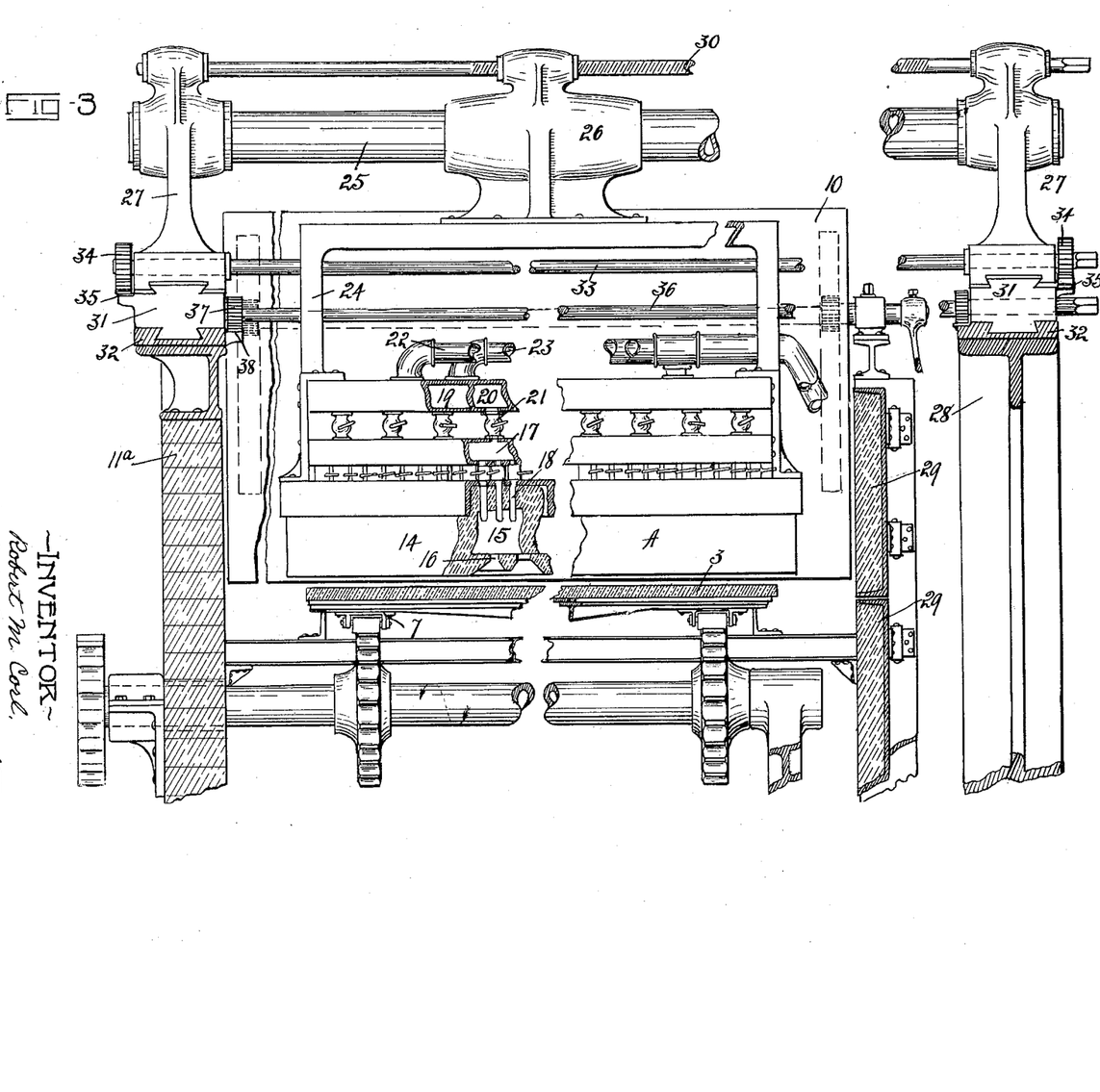
Fig. 3 is an enlarged section on the lines 3, 3 in Fig. 1 with parts broken away and removed.

The converting means illustrated comprises an upper gas burner or heater A and an upper electric heater B which are disposed above the sheet mass 3 within the converting compartment 11 and with the electric heater in advance of the heater A and over the converting point of the sheet. A gas burner or heater C is disposed within the compartment 11 below the converting point of the sheet. The gas burner A forms an initial heater for the sheet mass and comprises a chambered burner head 14, the chamber 15 of which (Fig. 3) is substantially co-extensive in length with the width of the sheet acted on and has its bottom wall provided with one or more longitudinally-extending slots 16 through which the flames from the burner are directed against the subjacent sheet. A mixing chamber 17 is mounted above the head 14 in fixed relation thereto and has communication with the interior of the burner head through a plurality of valve controlled gas jets 18. Mounted above the mixing chamber 17, in fixed relation thereto, are two conduits or manifolds 19 and 20 which are in respective communication with the interior of the mixing chamber through control valves 21, and these manifolds have supply pipes 22 and 23 leading thereto, respectively, from suitable sources of gas and air supply, whereby air is supplied to one manifold and gas to the other. The header 14, mixer 17 and manifolds 19 and 20 are carried, in the present instance, by an inverted U-shaped yoke 24, which is suspended from a superposed supporting shaft 25, said yoke having a bearing-head 26 at its top that is mounted for longitudinal sliding movements on said shaft. The shaft 25 is supported at its ends in bearing standards 27, 27 one of which is adjustably mounted on one side wall 11ª of the converter compartment, while the other is adjustably mounted on a support 28 that is laterally offset a distance from the side of the furnace or converter substantially equal to the length of the burner, whereby the burner may be drawn laterally from the furnace into the open space between the converter and standard 28 to facilitate adjustment of the valves or repair. For this purpose the side of the converter casing adjacent to the standard 28 is provided with doors 29, which may be opened to permit a lateral withdrawal of the burner from the converter chamber. The movements of the burner A lengthwise of the shaft 25 are effected by the turning of a control shaft 30, which is threaded through the bearing head 26 of the burner yoke and has its ends journaled in the upper ends of the bearings 27, 27.

To facilitate an adjustment of the burner A both vertically and longitudinally of the sheet mass 3, each bearing standard 27 has its base dove-tailed on top of a wedge-block 31 for sliding movements on the inclined top of said block lengthwise of the furnace, whereby to effect a vertical adjustment of the standards. The wedge-blocks 31 are in turn dove-tailed, or otherwise suitably mounted, on a top rail 32 of the respective wall 11ª and standard 28, which are mounted for lengthwise adjustment relative thereto. A shaft 33 connects and is journaled at its ends in the base portions of the bearing standards 27, 27 and carries a pinion 34 at each end in mesh with a rack 35 on the outer edge portion of the respective wedge-block 31 so that a turning of said pinions with the shaft 33 will effect a vertical adjustment of the standards 27, 27 relative to the wedge blocks. A second shaft 36 connects and is journaled at its ends in the respective blocks 31, 31 and carries a pinion 37 at the inner side of each of said wedge blocks and in mesh with a stationary rack 38 on the adjacent side of the respective rail 32, whereby a turning of the shaft 36 and its pinion will effect a longitudinal adjustment of the wedge blocks 31 relative to the rails 32. The shafts 33 and 36 extend through openings in the end portions of the yoke 24 and each of said shafts, as well as the shaft 30, has an end thereof squared, in the present instance, to enable a wrench or crank-arm to be fitted thereto.

It is evident that with the burner adjustment desired the burner may be raised or lowered with respect to the sheet 3 by turning the shaft 33 to effect a sliding adjustment of the standards 27 on the wedge blocks 31, and that a horizontal adjustment of the burner lengthwise of the sheet may be effected by turning the shaft 36, which moves the wedge blocks 31, lengthwise of the supporting rails 32 and carries the standards 27 therewith.

The burner B, which, in the present instance, is illustrated as being of the electric type, but which may comprise a gas burner, if desired, is mounted for adjustments vertically and longitudinally of the glass sheet 3 in a manner somewhat similar to the mounting of the burner A, and is also preferably mounted for vertical swinging adjustment lengthwise of the sheet to enable the burner base to be disposed at an angle which may be suited to the angle of flow of the finished thin sheet from the sheet mass at the converting point. In the present instance the burner B comprises a core 40, which core is co-extensive in length with the width of the sheet 3 to be treated. The core 40 is embraced on opposite sides by side strips 41 forming the secondary, and these strips interengage with the core to carry the same and are insulated therefrom. The secondary strips 41 are connected at one end to a primary coil 42 having a rheostat control 43 for regulating the current. A case 44 fits down over the core 40 and side strips 41, being insulated from said side strips, but not from the core 40. The side strips 41 have studs 45 projected up through registering openings in the top of the case 44, and nuts 45' are threaded to the outer ends of these studs to cooperate therewith to rigidly secure the side strips to the case, whereby both said strips and the core are carried by the case. A plurality of bottom strips 46 are extended across the bottom of the core 40 and the lower edges of the secondary side strips 41 and are held in spaced relation to the core by said side strips. The ends of the bottom strips 46 are extended up at the outer sides of side strips 41 in position to be clamped thereto by clamping blocks 47, from which they are insulated, one of which blocks is provided at each end of a bottom strip. The clamping blocks 47 have their upper edges in wedge coaction with the lower inner edges of the sides of the case 44, whereby an upward drawing of the wedge blocks 47 within the respective edge portions of the case 44 causes said blocks to firmly clamp the ends of the bottom strips 46 to the side strips 41. Each block 47 has a draft-bolt 48 projected upward therefrom through a registering aperture in the respective side of the case 44 and an adjusting nut 49 is threaded to the upper end of the bolt.

The heater case 44 is provided centrally on its top with a bracket 50 which has its top inclined transversely of the burner and is in adjustable dove-tailed sliding connection with the bottom of a suspending arm 51, whereby a relative adjustment of the bracket 50 and arm 51 lengthwise of the direction of movement of the sheet 3 effects a raising or lowering of the burner relative to the sheet. A shaft 52 is journaled in the lower end of the arm 51 transversely thereof and has a pinion 53 in mesh with a rack 54 on the adjacent edge of the bracket 50. It is thus evident that a turning of the shaft 52 will effect a relative adjustment of the members 50 and 51.

The arm 51 is suspended from a supporting shaft 55 which extends crosswise of the converting chamber 11 and is journaled at its respective ends in bearing standards 56 which are mounted on the rails 32, 32 at the respective sides of the furnace for sliding movements lengthwise thereof, the standards 56, in the present instance, having dove-tailed connection with said rails. A shaft 57 connects and is journaled at its ends in the base portions of the two standards 56 and carries a pinion 58 adjacent to its standard in mesh with a rack 59 on the respective rail 32, whereby a turning of said shaft will impart adjusting movements to the standards 56 lengthwise of the furnace. The shaft 57 extends through a segmental slot or opening 60 in the arm 51 and carries a crank 61 at one end. The arm 51 is splined to the shaft 55 for sliding movements lengthwise thereof and for swinging movements therewith, and a rocking adjustment is imparted to the shaft 55 by a turning of the crank 62, the shaft of which carries a worm 63 in mesh with a worm-wheel 64 on the shaft. The arm 51 is adjusted lengthwise of the shaft 55 by a turning of a shaft 65, which is journaled at its ends in the upper ends of the standards 56 and is threaded through a sleeve 66 that is mounted in a segmental slot 67 provided in the upper end of the arm 51. The slot 67 is concentric to the axis of the shaft 55, and the sleeve 66 is sufficiently loose therein to permit a relative swinging adjustment of the arm. Said sleeve is shouldered against the arms at the ends of the slot to prevent relative lengthwise movements of the sleeve in the arm.

The bottom burner C comprises the burner head 70 forming the interior chamber 71, which is coextensive in length with the width of the sheet being treated and has its top provided with a plurality of flame discharge slots 72, the size of each of which slots is regulated by an adjustment of one side wall thereof which is adjustably mounted for such purpose. A plurality of burner jets 73 enter the chamber 71 at the bottom thereof and the gas discharge therefrom is directed against a baffle flange 74 which extends from one side of the chamber wall to near the other thereof. A second set of burner jets 75 enter the forward side wall of the burner head above the flange 74 and below a pair of oppositely disposed baffle flanges 76, which restrict the passage of gases to the discharge slots 72. The burner jets 73 and 75 extend from a mixer base 11 to which the gas and air manifolds 78, 79 lead. The base 11 has its bottom inclined lengthwise of the furnace and mounted on the top of a wedge block 80 for shifting movements transversely thereof or lengthwise of the furnace. The block 80 is in turn mounted on a supporting bracket 81 for adjusting movements transversely thereof and lengthwise of the furnace, and this bracket is in turn mounted on a shaft 82 for rocking movements therewith and axial movements relative thereto. A stub-shaft 83 is journaled in one end of the mixer base 77 and carries a pinion 84 in mesh with a rack 85 on the adjacent end of the wedge-block 80, and a similar stub-shaft 86 is journaled in an end of the bracket 81 and carries a pinion 87 in mesh with a rack 88 on the wedge-block 80. It is thus evident that a turning of the shaft 83 and pinion 84 will effect a transverse adjustment of the mixer 77 and parts carried thereby relative to the wedge block 80 and will impart vertical adjustment to the burner head, and that a turning of the shaft 86 and pinion 87 will effect an adjustment of the wedge block 80 and mixer base 77 in unison transversely of the bracket 81 without changing the vertical position of the burner head. The shaft 82 is journaled at one end in the converter wall 11ª and at its other end in a bearing 89 that is mounted in a part of the offset side standard 28. A crank 90 has worm and worm-wheel connection with the shaft 82 to render it operable to impart rocking movements to said shafts, and a shaft 91 below the shaft 82 is journaled at its ends in or adjacent to the bearing members carrying the shaft 82 and is threaded intermediate its ends through a sleeve 92 that is carried in a slotted portion of the bracket 81 in the same manner that the sleeve 66 is carried by the bracket-arm. It is evident that a turning of the shaft 91 will impart adjustment to the lower burner C axially of the shaft 82 and that a turning of the shaft 82 will effect a rocking adjustment of said burner to vary the angle which its top bears to the sheet being treated.

The sheet mass or column 3 may be supported by a supporting roller 93 in advance of the conveyor 7 and in advance of or below the initial burner A of the converter. The heat of the burners B and C, which are converting burners, is directed against the sheet mass in advance of the roller 93 or other support and the thinning of the sheet mass to the desired finished or commercial thickness takes place at substantially the point of application of the intense heat from the burners B and C on the sheet, said heat being sufficient to cause a melting and substantially free flowing of the glass from the forward end of the sheet mass to form the relatively thinner sheet 3ª. The converted sheet 3ª extends downward and forward from the converting end of the sheet mass to the leer conveyor and the pull exerted thereon by said conveyor is properly regulated to take up the finished sheet at the speed at which it is desired to have it flow from the forward end of the sheet mass. The leer conveyor also may exert a slight pull or drawing stress on the sheet to facilitate its flow from the sheet mass. The application of heat to the sheet mass may be controlled by dampers arranged at suitable points, one of which is designated 94 and arranged to regulate the passage of heat forward along the sheet from the burners.

The support or table 12, over which the sheet passes between its point of conversion and the leer 13, is mounted at its forward end for both vertical swinging and horizontal adjustment to enable it to be adjusted to vary the point at which the converted sheet first comes in contact therewith. The greater the space between the converting end of the sheet mass and the point at which the converted sheet has contact with the top of the table 12, the greater will be the weight of such unsupported portion of the flowing sheet and the consequent tension or gravity pull of such portion on the sheet mass end. For this reason it is important that the member 12 be capable of adjustment to vary the length of the supported span of the sheet so as to regulate the tension on the converting portion of the sheet.

Figures 4, 5, 6, 7, 8:
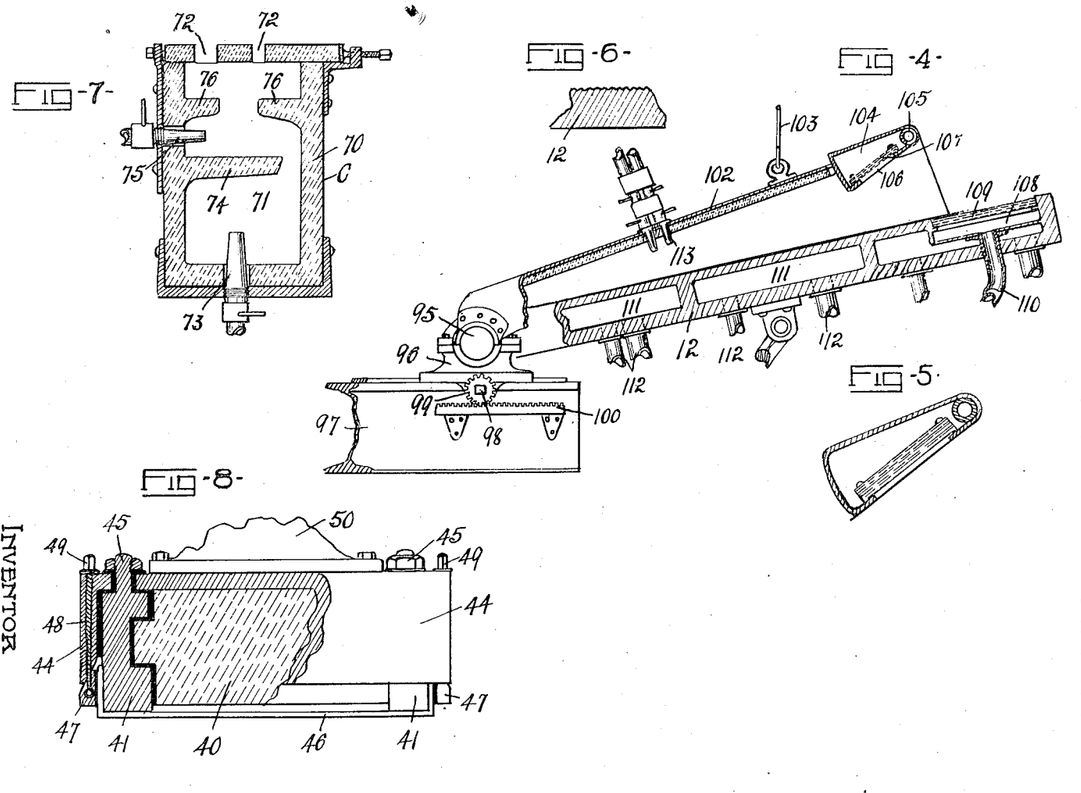
Fig. 4 is an enlarged side elevation of the tension table, its cover and adjusting and temperature controlling means, with parts broken away.
Fig. 5 is an enlarged section through the upper air blast control of the tension table cover.
Fig. 6 is an enlarged section of a portion of the tension table bed illustrating the corrugated or undulated sheet contacting surface.
Fig. 7 is an enlarged cross-section of the lower gas burner of the converter.
Fig. 8 is an enlarged end elevation of a portion of the electric heating element of the converter with part broken away.

For the purpose of such adjustment the table 12 is provided at its forward end with axially aligned side trunnions 95, which are journaled in bearing blocks 96 that rest for horizontal sliding adjustment lengthwise of the leer on the supporting bars 97 thereof. Each bearing block 96 carries a stub shaft 98 with a pinion 99 mounted thereon and in mesh with a rack 100 on the respective bar 97. It is thus evident that a turning of the shafts 98 effects a horizontal adjustment of the bearings 96 and a corresponding forward or backward movement to the table 12. The table 12 is adjustably supported in proper inclined position by an adjustable screw support 101, which connects a bracket on the bottom of said table to a bracket on the rear end of the leer. The top or sheet contacting surface of the table 12 is corrugated, as shown in enlarged detail in Fig. 6, to reduce the area of contact of the sheet with the table as much as possible and lessen the frictional resistance offered thereby.

In order to control the cooling of the finished sheet, after leaving the converter and before entering the leer, the table 12 is provided with an enclosing cover 102, which is loosely seated at its forward end on the trunnions 95 for vertical swinging movements relative thereto and is adjustably supported at or adjacent to its rear end by a cable 103, or in any other suitable manner, by means of which the cover may be raised entirely from the table or swingingly adjusted in a vertical plane with respect thereto. The cover is open at its front and rear ends to permit the passage of the glass sheet therethrough. The table cover 102 at its top rear portion is provided with a blast chamber 104 which is co-extensive in length with the width of the glass sheet and receives its blast supply through a conduit 105, which leads to any suitable source of air pressure supply. The bottom of the blast chamber 104 is provided with a large outlet opening 106 and this is covered by a plurality of thin gauze sheets 107, whereby the air is thoroughly broken up and distributed evenly throughout the area of the opening 106 in its discharge therethrough against the glass sheet. The blast chamber 104 is preferably adjustable, with the pipe 105 as its axis, to vary the adjustment of the air blast relative to the sheet to suit conditions. The table 12 is provided at its rear end with a similar air blast chamber 108, except that it is not adjustable with respect to the table, and the top of such chamber is closed by a plurality of gauze sheets 109, which are for the same purpose as the sheets 107 above described. The blast chamber 108 has a supply conduit 110 leading therethrough from any suitable source of air blast supply.

Figure 1:
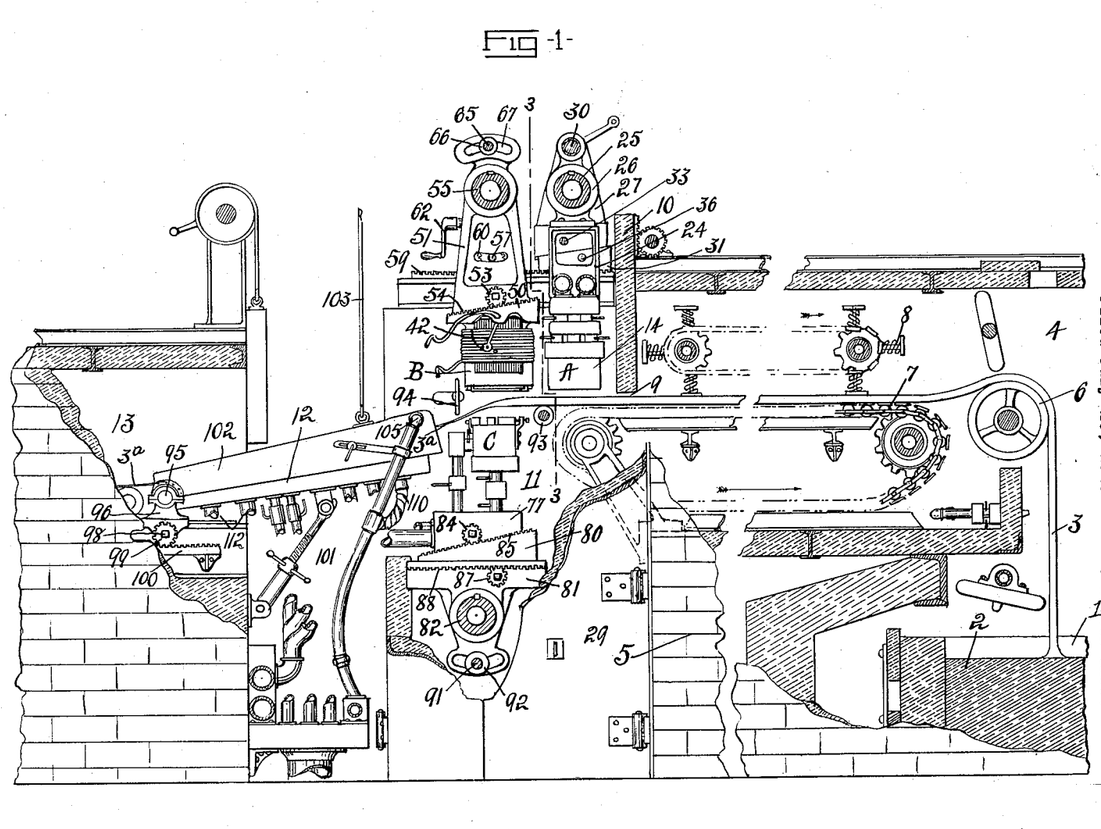
Figure 1 is a side elevation of an apparatus for practicing the invention with parts broken away.
Figure 2:
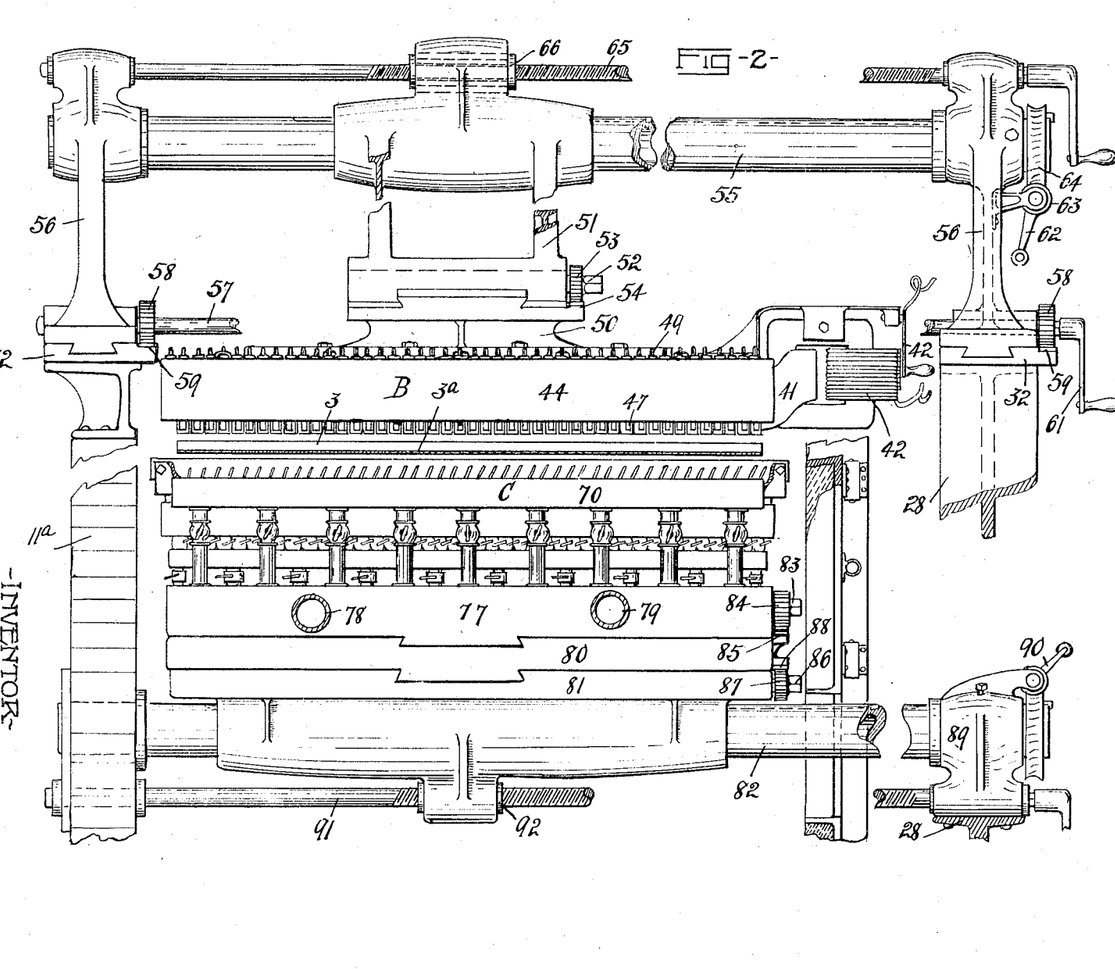
Fig. 2 is an enlarged front elevation of part of the converter with parts broken away.

It is preferable in practice to provide the table 12 with a plurality of separate interior chambers 111 to and from which a cooling fluid may flow through conduits 112. Where the cooling of the finished sheet would otherwise be rapid it is sometimes advisable to introduce a flame or heat generating medium into the space between the cover 102 and table 12, and for this purpose I have provided a plurality of burners 113 (not shown in Fig. 1), which are directed through the top of the cover 102 and have communication with any suitable source of gas supply.

In the use of my improved method and the apparatus illustrated for practicing the same, the sheet mass 3 of any desired thickness, but preferably of a thickness three or four times greater than the desired thickness of the finished ware, is drawn from the tank 1 within the furnace 5 up over the bending-roll 6 and forward between the supporting and drawing conveyor 7 and 8. As the sheet mass passes from the furnace chamber 4 into the converting chamber 11, it first passes under the initial heater A, which, in the present instance, is illustrated as being of the gas burner type, and the temperature of the sheet mass is raised thereby. The sheet as it passes between the converting burners B and C is further heated to such an extent as to permit or effect a free flowing of the glass from the forward end of the sheet mass in sheet form of a thickness desired for the finished ware. The thin or finished sheet then passes down and forward into the space between the table 12 and cover 102 free from contact with any element or part until it has sufficiently cooled to prevent injury to the sheet by reason of such contact. The cooling of the finished sheet is hastened by the air blasts from the blast chambers 104 and 108 disposed above and below to the sheet in advance of the converting zone. The point of contact of the sheet with the supporting table 12 is determined by an adjustment of the inclination of the table and also by a horizontal adjustment thereof, and the sheet after passing over said table passes onto the supporting and advancing conveyer within the leer. The initial converting burner A is mounted to facilitate an easy vertical or horizontal adjustment thereof to suit conditions, and the converting burners B and C are mounted to not only have vertical and horizontal adjustment, but also independent vertical swinging adjustment to vary the angularity of the burner faces with respect to the sheet at the converting point. Each of the burners is also so mounted that it can be easily and quickly moved from the converting chamber to one side thereof to facilitate adjustment or repair.

In addition to the advantages hereinbefore noted as being present in my improved method over the "direct" method heretofore employed of forming sheet glass, it is evident that in the practicing of my invention no serious loss of heat occurs, as the amount of heat necessary to bring the sheet mass to a working temperature is comparatively small due to the ability of a thick sheet mass to retain its temperature, glass being a poor conductor of heat. It is also obvious that the sheet mass could be slowly cooled to an atmospheric temperature and again raised to a working or converting temperature to form the finished ware. Such method, however, would necessarily be more expensive on account of the greater fuel consumption necessary to raise the temperature of the sheet from its cooled state.

It will be understood that the "converting heat" referred to herein and in the claims, means the application of such a heat to the sheet mass of glass as to cause a sheet of lesser thickness to flow therefrom by gravity as distinguished from heating the sheet mass at the converting point sufficient only to permit a thinning thereof by stretching action. In other words, in my process a sufficient heat is applied to the sheet mass to cause a melting of the glass so that the sheet mass is reduced in thickness by reason of the flow occasioned by such melting, and is not intended to apply merely to the softening of the glass to such an extent as will permit a stretching thereof by the application of a stress or pull thereon. In the melting action any bubbles or imperfections in the sheet mass become lost and obliterated in the resultant sheet, whereas in the softening and stretching action bubbles and other imperfections in the sheet mass are merely elongated in the resultant sheet.

I wish it understood that my invention is not limited to any specific method herein described, as it may be varied in numerous details without departing from the spirit of the claims, and also that my improved method is not limited to be practiced by the use of the apparatus shown and described, as such apparatus is merely illustrative of one manner of practicing the invention and is not intended to limit the scope of the same.

Having thus described my invention, what I claim as new, and desire to secure by Letters Patent, is—

1. The method of forming sheet glass, which consists in continuously drawing from a molten source of supply a sheet mass of glass which is of greater thickness than the finished sheet to render it easy to control and to reduce its sensitiveness to temperature changes and after the mass has become substantially set in form applying a converting heat to the forward end portion thereof continuous with the drawing to flow therefrom a finished sheet of less thickness than the mass.

2. The method of forming sheet glass, which consists in continuously drawing from a molten source of supply a sheet mass of glass which is of greater thickness than the finished sheet to render it easy to control and to reduce its sensitiveness to temperature changes and after the mass has become substantially set in form applying a converting heat to the forward end portion thereof continuous with the drawing to flow therefrom a finished sheet of less thickness than the mass, supporting the finished sheet at a distance from the converting mass end to prevent marring, and conveying the sheet away.

3. The method of forming sheet glass, which consists in continuously drawing from a molten source of supply a sheet mass of glass of at least twice the thickness of the finished sheet, and continuous with the drawing operation applying a converting heat to the mass to flow a finished sheet therefrom.

4. The method of forming sheet glass, which consists in continuously drawing from a molten source of supply a sheet mass of glass which is several times greater in thickness than the desired finished ware to render it easy to control and to reduce its sensitiveness to temperature changes and applying a converting heat to the forward end of the mass at a distance from the forming source to surface melt the same and cause a finished sheet to flow therefrom.

5. The method of forming sheet glass, which consists in continuously drawing from a molten source of supply a sheet mass of glass which is several times greater in thickness than the desired finished ware to render it easy to control and to reduce its sensitiveness to temperature changes, applying a converting heat to the forward end of the mass at a distance from the forming source to surface melt the same and cause a finished sheet to flow therefrom, and supporting the finished sheet at a distance from the converting mass end to prevent marring and conveying the sheet away.

6. The method of forming sheet glass, which consists in drawing a column from a supply of molten glass, cooling the column below drawing temperature, applying a melting heat to a portion of the column, and subjecting said portion to a force which will remove the glass in sheet form as fast as and only when melted.

7. The method of forming glass, which consists in drawing a column from a supply of molten glass, and, as the column is drawn, progressively cooling it below drawing temperature, progressively melting the forward portion of the column, subjecting said portion to a force which will remove the glass as fast as and only when melted, and allowing the glass to cool to final shape as removed.

8. The method of forming sheet glass which consists in drawing a column from a supply of molten glass, and, as the column is drawn, progressively cooling it below drawing temperature, continuously applying melting heat to the advance end of the cooled column, and subjecting the end to a force which will remove the glass as fast as and only when melted and in the form of a continuous sheet, and allowing the glass to cool to final shape as removed.

9. The method of forming glass which consists in drawing a column upward from a supply of molten glass, bending it and continuing to advance it in a horizontal direction, cooling it below drawing temperature, applying a melting heat to the forward end of the advancing column, and removing the glass as fast as and only when melted.

10. The method of forming sheet glass which consists in drawing a thick sheet upward from a supply of molten glass, bending the sheet and advancing it in a horizontal direction, allowing it to cool below drawing temperature, applying a melting heat to the advance end of the column and removing the glass in the form of a thin sheet as fast as and only when it is molten on said end.

11. The method of continuously forming sheet glass, which consists in drawing a mass of glass in sheet form from a molten source of supply, and, while the sheet mass is still hot, flowing by gravity at an angle therefrom a sheet of lesser thickness by the application of a converting heat.

12. The method of forming sheet glass, which consists in continuously drawing a mass of glass vertically in sheet form from a molten source of supply and, continuous with the drawing and before a complete cooling of the sheet mass, applying a converting heat thereto to flow a sheet of lesser thickness therefrom.

13. The method of forming sheet glass, which consists in drawing a thick mass of glass vertically in sheet form from a molten source of supply and while still heated, gradually increasing the temperature of the sheet to flow therefrom a sheet of lesser thickness.

14. The method of forming sheet glass, which consists in drawing a thick sheet mass of glass vertically from a molten source of supply, applying a converting heat to the sheet mass while being conveyed from the source of supply and still heated, whereby a sheet of lesser thickness than that of the mass is flowed therefrom, and imparting a relatively faster rate of travel to the thin sheet than the travel of the sheet mass.

15. The method of forming sheet glass, which consists of continuously drawing a thick mass of glass in sheet form from a molten source of supply, the sheet mass being drawn in a plane at an upward angle to the surface of the molten mass, and, while conveying the sheet mass away from the drawing source and maintaining heat therein, applying a converting heat to the sheet mass to continuously flow a sheet of predetermined thickness therefrom and then conveying the thinned sheet through a gradually reducing temperature.

16. The method of forming sheet glass, which consists in drawing a sheet mass of considerable relative thickness from a source of molten glass supply, passing such sheet mass over a bending-roll and subsequently applying a converting heat to a portion of the sheet being drawn throughout its width whereby a sheet of lesser thickness is caused to flow from the end of the sheet mass.

17. The method of forming sheet glass, which consists in drawing a sheet mass from a molten source of supply up over a bending member and forward therefrom and applying a converting heat to the sheet mass throughout its width at a predetermined point in its advance to cause the softening and flowing of a relatively thinner sheet from the forward end of the sheet mass.

18. The method of forming sheet glass, which consists in drawing a sheet mass from a source of molten glass supply and, continuous with said drawing, applying a converting heat to the sheet mass throughout its width and at a point in advance of the source of supply to cause a softening of the sheet mass and the flowing of a relatively thinner sheet therefrom.

19. The method of forming sheet glass, which consists in drawing a sheet mass of relatively great thickness from a source of molten glass supply and, continuous with such drawing, applying a converting heat to the sheet mass throughout its width at a point in advance of the source of supply to effect the flowing of a relatively thin sheet from the forward end of said sheet mass, the speed of advance of the thin sheet being relatively greater than the speed of advance of the sheet mass.

20. The method of forming sheet glass, which consists in drawing a sheet mass of considerable relative thickness from a source of molten glass supply, applying a converting heat to said sheet mass throughout its width and continuous with the drawing thereof and at a point remote from the source of supply to cause a flowing of a relatively thin sheet from the forward end of said sheet mass, said thin sheet being advanced at a speed relatively greater than the speed of advance of the sheet mass and being maintained free from contact with any surface until cooled sufficient to prevent surface injury.

21. The method of forming sheet glass, which consists in drawing a relatively thick sheet mass from a source of molten glass supply up and forward over a bending member, advancing the sheet mass a predetermined extent, then passing it through a converting heat zone to cause the flowing of a relatively thin sheet from the forward end of said sheet mass and subjecting said thin sheet to a cooling temperature as it flows from the converting end of the sheet mass.

22. The method of forming sheet glass which consists in drawing a relatively thick sheet mass from a source of molten glass supply up and forward over a bending member, advancing the sheet mass a predetermined extent, then passing it through a converting heat zone to cause the flowing of a relatively thin sheet from the forward end of said sheet mass, and subjecting said thin sheet to a cooling blast as it flows from the converting end of the sheet mass, said thin sheet looping downward and forward from the converting end of the sheet mass and extending through a cooling chamber.

23. A furnace having a glass drawing opening, a bending roll over said opening, a conveyor at one side of said roll adapted to receive and convey a thick column of glass drawn from the furnace and over the roll, a heater transverse the path of the column beyond the conveyor adapted to heat the column to flowing temperature, and means beyond the heater arranged in such manner as to cause the heated glass to elongate into a thinner column and adapted to receive and carry off the glass as it flows from the column.

24. The combination with a furnace from which a column of metal is drawn in sheet form, of means for applying heat to the column as it is drawn to flow a sheet of reduced thickness therefrom, means for conveying the column from the source of supply to the heating means, and means for conveying the reduced sheet away from the heating means as fast as and only when it flows from the column.

25. The combination with a furnace from which a column of glass is continuously drawn in sheet form, of means forming a converting chamber into which the column passes after leaving the furnace, means for conveying the column to said chamber, means for applying a converting heat to the column within said chamber to cause the flow of a sheet of less thickness therefrom, and means for supporting and conveying the thinned sheet away from the converting chamber.

26. The combination with a furnace of the class described from which a column of metal feeds, of a shaft extending transversely of the column and to one side thereof, and a heater carried by said shaft for adjustment lengthwise thereof to place it in operative or inoperative relation to said column.

27. The combination with a furnace of the class described from which a column of metal feeds, of a converting heater for raising the temperature of said column, and means carrying said heater and operable to impart adjustments thereto both transverse and longitudinal of the column.

28. The combination with a furnace from which a column of metal feeds, a shaft disposed transversely of said column, a heater carried by said shaft for adjustment lengthwise thereof, and means carrying said shaft and adjustable to vary its position relative to said column.

29. The combination with a converting chamber through which a column of glass feeds, of a heater disposed within said chamber for raising the temperature of the column passing therethrough, and means supporting said heater and adjustable to impart both vertical and horizontal adjustment to the heater.

30. The combination with a converting chamber through which a column of metal feeds, of a supporting member, a heater carried by said member adjacent to said column for raising the temperature thereof and adjustable lengthwise of said member, and means supporting said member and operable to both vertically and horizontally adjust the same.

31. The combination with a converting chamber through which a sheet of glass passes, of a heater within said chamber for raising the temperature of said sheet, means carrying said heater for vertical swinging adjustment lengthwise of the sheet and horizontal adjustment transversely thereof, and wedge means supporting said first means and operable to effect both a horizontal and vertical adjustment of said first means.

32. The combination with a furnace from which a sheet of glass continuously passes, of a table for supporting said sheet at a predetermined distance from the furnace as it passes therefrom, said table having its sheet contacting surface corrugated.

33. The combination with a furnace from which a finished sheet of glass continuously flows downward and forward, of a table at a predetermined distance in advance of the point of flow of the sheet from the furnace for supporting contact with the sheet after it has become sufficiently set to prevent marring, said table being mounted for vertical swinging adjustment to vary the point of contact of the sheet therewith, and means for tiltingly adjusting the table.

34. The combination with a furnace from which a sheet of glass continuously passes, of a substantially horizontal table for supporting said sheet at a predetermined distance from the furnace as it passes therefrom, the delivery end of said table being pivoted and the receiving end thereof being mounted for vertical swinging adjustment to vary the point of contact of the sheet therewith, the table having its sheet contacting surface corrugated, and means for tiltingly adjusting the table.

In testimony whereof, I have hereunto signed my name to this specification.

ROBERT M. CORL.